(12) United States Patent
Ose et al.

(10) Patent No.: US 11,069,947 B2
(45) Date of Patent: Jul. 20, 2021

(54) ELECTRODE FOR SOLID-STATE BATTERIES AND SOLID-STATE BATTERY

(71) Applicant: TOYOTA JIDOSHA KABUSHIKI KAISHA, Toyota (JP)

(72) Inventors: Norihiro Ose, Sunto-gun (JP); Tomoya Suzuki, Seto (JP); Hajime Hasegawa, Susono (JP); Kazuo Yaso, Susono (JP); Hideaki Nishimura, Sunto-gun (JP); Yuki Matsushita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/519,360

(22) Filed: Jul. 23, 2019

(65) Prior Publication Data

US 2020/0035983 A1    Jan. 30, 2020

(30) Foreign Application Priority Data

Jul. 27, 2018  (JP) .............................. JP2018-141530

(51) Int. Cl.
| | |
|---|---|
| *H01M 50/581* | (2021.01) |
| *H01M 4/58* | (2010.01) |
| *H01M 10/0562* | (2010.01) |

(52) U.S. Cl.
CPC ........... *H01M 50/581* (2021.01); *H01M 4/58* (2013.01); *H01M 10/0562* (2013.01)

(58) Field of Classification Search
CPC .... H01M 2/348; H01M 4/58; H01M 10/0562; H01M 10/637; H01M 2200/106; H01M 50/581; H01C 7/027; H01C 7/021
See application file for complete search history.

(56) References Cited

U.S. PATENT DOCUMENTS

| | | | |
|---|---|---|---|
| 4,775,778 A | 10/1988 | van Konynenburg et al. | |
| 2008/0241684 A1 | 10/2008 | Muraoka et al. | |
| 2014/0079995 A1 | 3/2014 | Wakada | |
| 2015/0086875 A1* | 3/2015 | Yoshida | H01M 10/052 429/322 |
| 2015/0303484 A1* | 10/2015 | Iida | H01M 4/664 429/233 |

(Continued)

FOREIGN PATENT DOCUMENTS

| | | |
|---|---|---|
| JP | 2015204221 A * | 11/2015 |
| JP | 2017-130283 A | 7/2017 |

(Continued)

OTHER PUBLICATIONS

Dec. 22, 2020 Office Action issued in U.S. Appl. No. 16/519,064.

*Primary Examiner* — Maria Laios
*Assistant Examiner* — Brett M Hostert
(74) *Attorney, Agent, or Firm* — Oliff PLC

(57) ABSTRACT

An electrode for solid-state batteries, comprising a PTC resistor layer, and a solid-state battery comprising the electrode. The electrode may be an electrode for solid-state batteries, wherein the electrode comprises an electrode active material layer, a current collector and a PTC resistor layer which is disposed between the electrode active material layer and the current collector and which is in contact with the electrode active material layer; wherein the PTC resistor layer contains a carbon-containing electroconductive material, an insulating inorganic substance and a fluorine-containing polymer.

6 Claims, 2 Drawing Sheets

(56) References Cited

U.S. PATENT DOCUMENTS

| | | |
|---|---|---|
| 2017/0207440 A1 | 7/2017 | Hama et al. |
| 2018/0006348 A1 | 1/2018 | Ebisuzaki et al. |
| 2018/0026301 A1 | 1/2018 | Ebisuzaki et al. |
| 2019/0123355 A1 | 4/2019 | Ebisuzaki et al. |
| 2020/0035988 A1 | 1/2020 | Ose et al. |
| 2020/0035990 A1 | 1/2020 | Ose et al. |
| 2020/0036009 A1 | 1/2020 | Ose et al. |

FOREIGN PATENT DOCUMENTS

| | | |
|---|---|---|
| JP | 2018-010848 A | 1/2018 |
| JP | 2018-014286 A | 1/2018 |
| JP | 2018-113151 A | 7/2018 |
| JP | 2019-079611 A | 5/2019 |

\* cited by examiner

ELECTRODE FOR SOLID-STATE BATTERIES AND SOLID-STATE BATTERY

TECHNICAL FIELD

The disclosure relates to an electrode for solid-state batteries and a solid-state battery comprising the electrode.

BACKGROUND

In a battery used as an in-vehicle power source or as a power source for notebook PCs and portable devices, the temperature of the whole battery may increase due to an internal short circuit or overcharging and may have adverse effects on the battery itself or on a device using the battery.

As a measure to prevent the adverse effects, a technique of using an electrode has been attempted, the electrode comprising a positive temperature coefficient (PTC) resistor layer which has electron conductivity at room temperature and which shows an increase in electronic resistance value with an increase in temperature.

Patent Literature 1 discloses an all-solid-state state battery comprising a laminate of a cathode active material layer, a solid electrolyte layer, and an anode active material layer in this order, and a restraining member that applies a restraining pressure to the laminate in a laminated direction, wherein a PTC layer containing a conductive material, an insulating inorganic substance and a polymer, is disposed at least at one of a position between the cathode active material layer and a cathode current collecting layer for collecting electrons of the cathode active material layer, and a position between the anode active material layer and an anode current collecting layer for collecting electrons of the anode active material layer, and the content of the insulating inorganic substance in the PTC layer is 50 volume % or more.

Patent Literature 2 discloses an all-solid-state battery comprising: a cathode layer comprising a cathode active material layer and a cathode current collector; an anode layer comprising an anode active material layer and an anode current collector; and a solid electrolyte layer disposed between the cathode active material layer and the anode active material layer, wherein the all-solid-state battery further comprises a PTC film between the cathode current collector and the cathode active material layer and/or between the anode current collector and the anode active material layer, and the PTC film contains a conductive material and a resin.

Patent Literature 1: Japanese Patent Application Laid-Open (JP-A) No. 2018-014286
Patent Literature 2: JP-A No. 2017-130283

However, the electrode as disclosed in Patent Literature 1, the electrode comprising the PTC resistor layer containing the insulating inorganic substance, has a problem in that electronic resistance at the interface between the PTC resistor layer and the electrode active material layer in a room temperature condition (15° C. to 30° C.) is large. The electrode as disclosed in Patent Literature 2, the electrode comprising the PTC resistor layer not containing the insulating inorganic substance, has a problem in that electronic resistance is decreased in a high temperature condition due to the effects of confining pressure.

SUMMARY

The disclosed embodiments were achieved in light of the above circumstance. An object of the disclosed embodiments is to provide an electrode for solid-state batteries, comprising at least a PTC resistor layer in which electronic resistance in a room temperature condition is low. Another object of the disclosed embodiments is to provide a solid-state battery comprising the electrode.

In a first embodiment, there is provided an electrode for solid-state batteries,
wherein the electrode comprises an electrode active material layer, a current collector and a PTC resistor layer which is disposed between the electrode active material layer and the current collector and which is in contact with the electrode active material layer;
wherein the PTC resistor layer contains a carbon-containing electroconductive material, an insulating inorganic substance and a fluorine-containing polymer;
wherein a hardness of an electrode active material layer-contacting surface of the PTC resistor layer, is 0.36 GPa or less; and
wherein, when the PTC resistor layer is divided into an A layer and a B layer in order from nearest to furthest from the electrode active material layer so that, at any point of the PTC resistor layer, a ratio of a thickness of the A layer to a thickness of the B layer is 1:2 in a thickness direction of the PTC resistor layer,
a value obtained by dividing an atomic percentage of carbon atoms contained in the A layer by an atomic percentage of fluorine atoms contained in the A layer, is from 2.4 to 3.9.

The hardness of the electrode active material layer-contacting surface of the PTC resistor layer, may be from 0.22 GPa to 0.36 GPa.

The insulating inorganic substance may be a metal oxide.

The carbon-containing electroconductive material may be carbon black.

In another embodiment, there is provided a solid-state battery comprising a cathode, an anode and an electrolyte layer disposed between the cathode and the anode, wherein at least one of the cathode and the anode is the above-mentioned electrode.

For the electrode for solid-state batteries according to the disclosed embodiments, the hardness of the electrode active material layer-contacting surface of the PTC resistor layer, is the specific value or less, and the content ratio of carbon atoms with respect to fluorine atoms in the A layer that is near the electrode active material layer, is in the specific value range, whereby the electrode active material layer-contacting surface of the PTC resistor layer has better flexibility than ever before, and excellent contact between the PTC resistor layer and the electrode active material layer is obtained, resulting in excellent followability of the PTC resistor layer to the electrode active material layer surface. As a result, when the electrode is used in a solid-state battery, an increase in the electronic resistance at the interface between the PTC resistor layer and the electrode active material layer, can be suppressed, and a decrease in the performance of the solid-state battery can be suppressed.

BRIEF DESCRIPTION OF THE DRAWINGS

In the accompanying drawings.

DETAILED DESCRIPTION

1. Electrode for Solid-State Batteries

Figure 1:
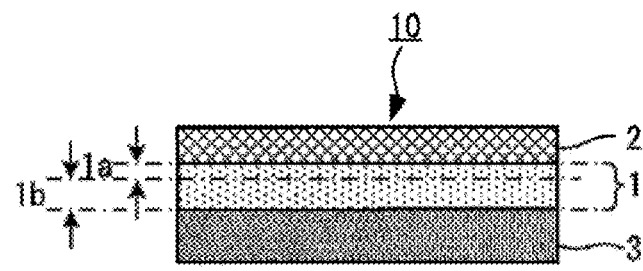
FIG. 1 is a view showing an example of the layer structure of the electrode for solid-state batteries according to the disclosed embodiments, and it is also a schematic cross sectional view of the electrode along the laminating direction.

The electrode for solid-state batteries according to the disclosed embodiments, is an electrode for solid-state batteries, wherein the electrode comprises an electrode active material layer, a current collector and a PTC resistor layer which is disposed between the electrode active material layer and the current collector and which is in contact with the electrode active material layer;

wherein the PTC resistor layer contains a carbon-containing electroconductive material, an insulating inorganic substance and a fluorine-containing polymer;

wherein a hardness of an electrode active material layer-contacting surface of the PTC resistor layer, is 0.36 GPa or less; and wherein, when the PTC resistor layer is divided into an A layer and a B layer in order from nearest to furthest from the electrode active material layer so that, at any point of the PTC resistor layer, a ratio of a thickness of the A layer to a thickness of the B layer is 1:2 in a thickness direction of the PTC resistor layer, a value obtained by dividing an atomic percentage of carbon atoms contained in the A layer by an atomic percentage of fluorine atoms contained in the A layer, is from 2.4 to 3.9.

It is known that if a layer containing an electroconductive material and a polymer is disposed between the electrode active material layer and the current collector, the layer shows a PTC resistor function (a rapid increase in electronic resistance) when the temperature of the layer exceeds the melting point of the polymer by heating. The PTC resistor function is exerted when the particles of the electroconductive material, which are in contact with each other, are separated by thermal expansion of the polymer and result in blocking of electron conduction. In the disclosed embodiments, the layer showing such a PTC resistor function is referred to as "PTC resistor layer".

In the solid-state battery comprising the PTC resistor layer, when the temperature of the solid-state battery is increased due to overcharging or a short circuit, electron conduction between the electrode active material layer and the current collector is blocked, and an electrochemical reaction is arrested. Accordingly, a further increase in temperature is suppressed and makes it possible to prevent adverse effects on the solid-state battery itself and on a device using the solid-state battery.

For the PTC resistor layer containing the electroconductive material and the polymer, the polymer is deformed and fluidized when pressure is applied to the solid-state battery, whereby the PTC resistor layer cannot maintain its structure and, as a result, may fail to exert the PTC resistor function. In Patent Literature 1, for the purpose of allowing the PTC resistor layer to maintain its structure even when pressure is applied to the solid-state battery, the PTC resistor layer that further contains an insulating inorganic substance, which is generally said to have high strength, is disclosed. It was thought that inside the PTC resistor layer, electronic resistance is increased by the insulating inorganic substance, thereby increasing electronic resistance in the whole electrode.

However, as a result of research, it was found that in the electrode comprising the PTC resistor layer containing the insulating inorganic substance, not only the electronic resistance inside the PTC resistor layer is high, but also the electronic resistance at the interface between the PTC resistor layer and the electrode active material layer, is high. This seems to be because contact between the PTC resistor layer and the electrode active material layer at the interface therebetween, is decreased due to the presence of large amounts of the insulating inorganic substance on the surface of the PTC resistor layer.

For the electrode for solid-state batteries according to the disclosed embodiments, the hardness of the electrode active material layer-contacting surface of the PTC resistor layer, is the specific value or less, and the content ratio of carbon atoms with respect to fluorine atoms in the A layer that is near the electrode active material layer, is in the specific value range. As a result, when the electrode is used in a solid-state battery, a decrease in the performance of the solid-state battery can be suppressed.

The electrode for solid-state batteries according to the disclosed embodiments comprises an electrode active material layer, a current collector and a PTC resistor layer.

FIG. 1 is a view showing an example of the layer structure of the electrode for solid-state batteries according to the disclosed embodiments, and it is also a schematic cross sectional view of the electrode along the laminating direction. As shown in FIG. 1, an electrode 10 for solid-state batteries according to the disclosed embodiments, comprises an electrode active material layer 2, a current collector 3, and a PTC resistor layer 1 disposed between the electrode active material layer 2 and the current collector 3.

As shown in FIG. 1, the PTC resistor layer 1 is in contact with the electrode active material layer 2. Also, as shown in FIG. 1, the PTC resistor layer 1 may be in contact with the current collector 3. A different layer (not shown in FIG. 1) may be present between the PTC resistor layer 1 and current collector 3 of the electrode 10 for solid-state batteries.

The PTC resistor layer 1 includes an A layer 1*a*, which is present near the electrode active material layer 2, and a B layer 1*b*, which is present near the current collector 3. As will be described below, the content ratio of carbon atoms with respect to fluorine atoms in the A layer 1*a*, is in the specific range.

Hereinafter, these layers of the electrode for solid-state batteries will be described in detail.

(1) PTC Resistor Layer

The PTC resistor layer is a layer which contains a carbon-containing electroconductive material, an insulating inorganic substance and a fluorine-containing polymer, which is disposed between the electrode active material layer and the current collector, and which is in contact with the electrode active material layer.

The carbon-containing electroconductive material contained in the PTC resistor layer is not particularly limited, as long as it contains carbon atoms and it has electroconductivity. As the carbon-containing electroconductive material, examples include, but are not limited to, carbon black, activated carbon, carbon fiber (e.g., carbon nanotube, carbon nanofiber) and graphite. The carbon-containing electroconductive material contained in the PTC resistor layer may be carbon black. The carbon-containing electroconductive material may be in a particulate form. As the particulate form, examples include, but are not limited to, a fibrous form.

The volume ratio of the carbon-containing electroconductive material in the PTC resistor layer is not particularly limited. When the total volume of the carbon-containing electroconductive material, the insulating inorganic substance and the fluorine-containing polymer is determined as 100 volume %, the volume ratio of the carbon-containing electroconductive material in the PTC resistor layer may be from 7 volume % to 50 volume %, or it may be from 7 volume % to 10 volume %.

The insulating inorganic substance contained in the PTC resistor layer functions to suppress deformation and fluidization of the PTC resistor layer in the electrode for solid-state batteries, both of which are due to high temperature and pressure.

The insulating inorganic substance is not particularly limited, as long as it is a material that has a higher melting point than the below-described fluorine-containing polymer. As the insulating inorganic substance, examples include, but are not limited to, a metal oxide and a metal nitride. As the metal oxide, examples include, but are not limited to, alumina, zirconia and silica. As the metal nitride, examples include, but are not limited to, a silicon nitride. Also, as the insulating inorganic substance, examples include, but are not limited to, a ceramic material. The insulating inorganic substance may be a metal oxide.

In general, the insulating inorganic substance is in a particulate form. The insulating inorganic substance may be primary particles or secondary particles.

The average particle diameter ($D_{50}$) of the insulating inorganic substance may be from 0.2 μm to 5 μm, or it may be from 0.4 μm to 2 μm, for example. The particle size distribution of the insulating inorganic substance particles is not particularly limited. The particle size distribution of the particles may be a normal distribution when it is represented by a frequency distribution.

The volume ratio of the insulating inorganic substance in the PTC resistor layer is not particularly limited. When the total volume of the carbon-containing electroconductive material, the insulating inorganic substance and the fluorine-containing polymer is determined as 100 volume %, the volume ratio of the insulating inorganic substance in the PTC resistor layer may be from 40 volume % to 85 volume %, or it may be from 50 volume % to 60 volume %.

When the volume ratio of the insulating inorganic substance in the PTC resistor layer is too small, it may be difficult to sufficiently suppress the deformation and fluidization of the PTC resistor layer, both of which are due to heating and pressure. On the other hand, when the volume ratio of the insulating inorganic substance in the PTC resistor layer is too large, the volume ratio of the fluorine-containing polymer is relatively small. As a result, the effect of separating the particles of the carbon-containing electroconductive material by the fluorine-containing polymer may be insufficiently exerted, and an increase in electronic resistance may be insufficient. Also when the volume ratio of the insulating inorganic substance in the PTC resistor layer is too large, electroconductive paths, which are formed by the carbon-containing electroconductive material, may be blocked by the insulating inorganic substance, and the electron conductivity of the PTC resistor layer during normal use may decrease. In the disclosed embodiments, the electron conductivity of the PTC resistor layer means the property of conducting electrons through the PTC resistor layer, and it is strictly different from the electroconductivity of the PTC resistor layer (the property of conducting electricity through the PTC resistor layer).

The fluorine-containing polymer contained in the PTC resistor layer is not particularly limited, as long as it is a polymer which contains fluorine and which expands when its temperature exceeds its melting point by heating. As the fluorine-containing polymer, examples include, but are not limited to, polyvinylidene fluoride (PVDF), polyfluoroethylene (PTFE), perfluoroalkoxy alkane (PFA), perfluoro ethylene-propylene copolymer (FEP) and polychlorotrifluoroethylene (PCTFE). These fluorine-containing polymers may be used alone or in combination of two or more kinds.

From the viewpoint of melting point and ease of processing, the fluorine-containing polymer may be polyvinylidene fluoride or polyfluoroethylene. The fluorine-containing polymer may be polyvinylidene fluoride.

The volume ratio of the fluorine-containing polymer in the PTC resistor layer is not particularly limited. When the total volume of the carbon-containing electroconductive material, the insulating inorganic substance and the fluorine-containing polymer is determined as 100 volume %, the volume ratio of the fluorine-containing polymer in the PTC resistor layer may be from 8 volume % to 60 volume %, or it may be from 8 volume % to 45 volume %.

The thickness of the PTC resistor layer is not particularly limited. It may be from about 1 μm to about 30 μm.

As described above, the electrode comprising the PTC resistor layer containing the insulating inorganic substance, has a problem in that the electronic resistance at the interface between the PTC resistor layer and the electrode active material layer in a room temperature condition (15° C. to 30° C.) is large. As just described, when the insulating inorganic substance is used to increase the electronic resistance in a high temperature condition, the electronic resistance in a room temperature condition also increases. However, in the case of decreasing only the content ratio of the insulating inorganic substance, the electronic resistance in a high temperature condition decreases, so that the PTC resistor layer cannot sufficiently function.

Accordingly, to decrease the electronic resistance in a room temperature condition while keeping the high electronic resistance in a high temperature condition, it is needed to enhance the flexibility, contact and followability of the PTC resistor layer with respect to the electrode active material layer. As just described, by enhancing the physical properties of the PTC resistor layer, the number of electronic contact points disposed at the interface between the PTC resistor layer and the electrode active material layer, can be increased more than ever before. The electronic contact points mean contact points between the PTC resistor layer and the electrode active material layer, at which at least electron conduction is possible. As a result, in a room temperature condition, the electronic resistance at the interface between the PTC resistor layer and the electrode active material layer can be suppressed, and a decrease in the performance of the solid-state battery comprising the electrode for solid-state batteries according to the disclosed embodiments, can be suppressed. On the other hand, since it is not needed to decrease the amount of the insulating inorganic substance in the PTC resistor layer, there is no decrease in electronic resistance in a high temperature condition, and the function of stopping charging/discharging of the solid-state battery can be exerted at the time of occurrence of a failure, confining the solid-state battery, etc.

In the disclosed embodiments, the hardness of the electrode active material layer-contacting surface of the PTC resistor layer, is used as the indicator of the flexibility, contact and followability of the PTC resistor layer with respect to the electrode active material layer. The smaller the hardness, the better the flexibility of the electrode active material layer-contacting surface of the PTC resistor layer. Accordingly, excellent contact between the PTC resistor layer and the electrode active material layer is obtained, resulting in excellent followability of the PTC resistor layer to the electrode active material layer surface and more electronic contact points between the PTC resistor layer and the electrode active material layer than ever before. As a result, an increase in the electronic resistance between the PTC resistor layer and the electrode active material layer in a room temperature condition, can be suppressed, and a decrease in the performance of the solid-state battery can be suppressed.

In the disclosed embodiments, the hardness of the electrode active material layer-contacting surface of the PTC resistor layer, is hardness measured by the nanoindentation test according to ISO14577:2015 (Part. 1: Test method).

A sample is used in the nanoindentation test, and it may be the PTC resistor layer itself or may be a laminate in which the PTC resistor layer appears on at least one surface of the laminate. As the laminate, examples include, but are not limited to, a laminate of the PTC resistor layer and the current collector, a laminate of the PTC resistor layer and the electrode active material layer, and a laminate of the PTC resistor layer and a substrate. The substrate means a material which serves as a support for forming the PTC resistor layer and which is other than the current collector and the electrode active material layer. Typically, it means a substrate for transferring the PTC resistor layer.

The laminate of the PTC resistor layer and the current collector may be one that is obtained from the electrode or the solid-state battery comprising the electrode, or it may be a laminate A used for production of evaluation samples described below.

The laminate of the PTC resistor layer and the electrode active material layer may be one that is obtained from the electrode or the solid-state battery comprising the electrode, or it may be a laminate B used for the production of evaluation samples described below.

The method for measuring the hardness of the electrode active material layer-contacting surface of the PTC resistor layer, is as follows.

For the above-described sample, the hardness of the surface on which the PTC resistor layer appears, is measured by use of a nanoindenter (product name: G200, manufactured by: MTS Systems Corporation) and in accordance with ISO 14577:2015 (Part. 1: Test method). More specifically, 15 points at an indentation depth of from 400 nm to 600 nm are measured for hardness (GPa).

The average of the hardness values thus obtained is determined as the hardness of the electrode active material layer-contacting surface of the PTC resistor layer.

The hardness of the electrode active material layer-contacting surface of the PTC resistor layer, is 0.36 GPa or less. If the hardness is more than 0.36 GPa, the flexibility, contact and followability of the PTC resistor layer with respect to the electrode active material layer, are all insufficient and the number of the electronic contact points between the layers are small. Accordingly, even if the electrode with such a hardness is used in the solid-state battery, it is difficult to suppress a decrease in the performance of the solid-state battery.

The hardness of the electrode active material layer-contacting surface of the PTC resistor layer, may be from 0.22 GPa to 0.36 GPa, may be from 0.23 GPa to 0.35 GPa, or may be from 0.24 GPa to 0.34 GPa. In general, it is often technically difficult to control the hardness of the electrode active material layer-contacting surface of the PTC resistor layer to less than 0.22 GPa, depending on the type and content ratio of materials contained in the PTC resistor layer.

The hardness of the electrode active material layer-contacting surface of the PTC resistor layer, can be controlled to 0.36 GPa or less by, for example, like the below-described production method, forming the PTC resistor layer by applying a second slurry to the surface of a first coating layer. In this case, the content of the insulating inorganic substance in the second slurry may be zero, or the volume ratio (on the basis of solid content) of the insulating inorganic substance contained in the second slurry may be smaller than the volume ratio of the insulating inorganic substance in the first coating layer.

Also, the hardness can be achieved by a pressing method such as roll pressing (which will be described below), cold isostatic pressing (CIP) and hot isostatic pressing (HIP). However, applying the second slurry to the first coating layer surface is more effective in controlling the hardness to 0.36 GPa or less, than pressing the laminate including the PTC resistor layer.

Controlling the amount of the carbon-containing electroconductive material contained in the second slurry, controlling the thickness of the applied second slurry, etc., are also effective in reducing the thickness further.

The method for measuring the hardness of the electrode active material layer-contacting surface of the PTC resistor layer included in the thus-obtained solid-state battery, is not particularly limited. For example, the hardness can be measured by the following method. First, the below-described solid-state battery is disassembled in an inert atmosphere (e.g., Ar gas atmosphere) and the PTC resistor layer is taken out from the disassembled solid-state battery.

Then, for a surface of the PTC resistor layer, which was in contact with the electrode active material layer before disassembling the solid-state battery, the hardness is measured by use of the nanoindenter (product name: G200, manufactured by: MTS Systems Corporation) and in accordance with ISO 14577:2015 (Part. 1: Test method). More specifically, 15 points at an indentation depth of from 400 nm to 600 nm are measured for hardness (GPa).

The average of the hardness values thus obtained is determined as the hardness of the electrode active material layer-contacting surface of the PTC resistor layer.

In the disclosed embodiments, the PTC resistor layer is divided into an A layer and a B layer in order from nearest to furthest from the electrode active material layer so that, at any point of the PTC resistor layer, the ratio of the thickness of the A layer to the thickness of the B layer is 1:2 in the thickness direction of the PTC resistor layer. The thickness direction of the PTC resistor layer means a direction vertical to a direction in which the PTC resistor layer extends. In other words, it means a direction parallel to the laminating direction of the laminate of the electrode active material layer, the PTC resistor layer and the current collector.

The A layer is a layer starting from the interface between the PTC resistor layer and the electrode active material layer and occupying one-third of the thickness of the PTC resistor layer. Meanwhile, the B layer is a layer starting from the interface between the PTC resistor layer and a layer disposed on the opposite side of the electrode active material layer (e.g., from the interface between the PTC resistor layer and a current collector layer) and occupying two-thirds of the thickness of the PTC resistor layer. A main feature of the disclosed embodiments is that the content ratio of the carbon atoms with respect to the fluorine atoms in the A layer is in the specific value range.

In the disclosed embodiments, the A layer and the B layer are defined so that, at any point of the PTC resistor layer, the ratio of the thickness of the A layer to the thickness of the B layer is 1:2 in the thickness direction of the PTC resistor layer. Actually, since the A layer and the B layer are combined to form the PTC resistor layer in many cases, it is difficult to absolutely separate them. The above definition is merely a definition that is conveniently provided to define the content ratio of the carbon atoms with respect to the fluorine atoms in a part of the PTC resistor layer, which is on the side near the electrode active material layer.

The value obtained by dividing the atomic percentage (atomic %) of the carbon atoms (C) contained in the A layer by the atomic percentage (atomic %) of the fluorine atoms (F) contained in the A layer (hereinafter the value may be referred to as C/F value) is generally from 2.4 to 3.9. The C/F value may be from 2.5 to 3.8, or it may be from 2.6 to 3.7.

Since the C/F value of the A layer, which is on the side near the electrode active material layer, of the PTC resistor layer is in the above range, the thermal stability of the whole PTC resistor layer is increased, and the electronic resistance value of the whole PTC resistor layer in a high temperature condition is more increased. As a result, in the case of using the electrode for solid-state batteries according to the disclosed embodiments in a solid-state battery, progression of battery reaction can be suppressed when the battery temperature is increased due to an internal short circuit, etc.

When the C/F value is smaller than 2.4, the carbon amount in the A layer is too small. As a result, a sufficient number of electroconductive paths are not ensured at the interface between the PTC resistor layer and the electrode active material layer. On the other hand, when the C/F value is larger than 3.9, the carbon amount in the A layer is too large. As a result, the thermal stability of the whole PTC resistor layer is decreased.

An indicator of the thermal stability may be the electronic resistance in a high temperature condition (e.g., 250° C.), for example. As the electronic resistance in a high temperature condition increases, the electrode for solid-state batteries obtains better thermal stability.

In the disclosed embodiments, the method for calculating the C/F value is as follows.

First, the electrode for solid-state batteries is subjected to cross section polishing by a cross section polisher (CP), thereby obtaining a cross section. The cross section of the PTC resistor layer is observed with a field emission-scanning electron microscope (FE-SEM), thereby obtaining a SEM image.

Next, on the SEM image, the PTC resistor layer is divided into the A layer and the B layer in order from nearest to furthest from the electrode active material layer so that, at any point of the PTC resistor layer, the ratio of the thickness of the A layer to the thickness of the B layer is 1:2 in the thickness direction of the PTC resistor layer. Accordingly, the cross-sectional area of the A layer is one-third of the cross-sectional area of the whole PTC resistor layer, and the cross-sectional area of the B layer is two-thirds of the cross-sectional area of the whole PTC resistor layer. There is a possibility that the A layer is not absolutely the same as a second coating layer used in a production method described below (a layer on the side near the cathode active material layer), and there is a possibility that the B layer is not absolutely the same as a first coating layer used in the production method described below (a layer on the side near the current collector).

Next, a cross section of the A layer of the PTC resistor layer is subjected to elemental analysis by flat quad-energy dispersive X-ray spectroscopy (FQ-EDX). The cross section of the A layer of the PTC resistor layer is a cross section of the A layer defined from the above-described SEM image.

Next, from the results of the elemental analysis, the amount (atomic %) of C contained in the cross section of the A layer and the amount of F (atomic %) contained therein are calculated. The C amount (atomic %) is divided by the F amount (atomic %), and the resulting value is used as the C/F value of the electrode for solid-state batteries.

In this evaluation method, in place of the electrode for solid-state batteries, a solid-state battery comprising the electrode for solid-state batteries may be used, or an evaluation sample described below may be used.

The contact area between the PTC resistor layer and the electrode active material layer is not particularly limited. As long as 50% or more, 70% or more, or 99% or more of the area of the electrode active material layer is in contact with the PTC resistor layer, the effect of suppressing the electronic resistance at the interface between the PTC resistor layer and the electrode active material layer, is sufficiently exerted.

The contact area between the PTC resistor layer and the electrode active material layer means an area where the PTC resistor layer and the electrode active material layer are apparently in contact with each other, regardless of the presence or absence of the electronic contact points between the layers.

(2) Electrode Active Material Layer

The electrode active material layer is not particularly limited, as long as it contains at least an electrode active material. As needed, it may contain a binder, an electroconductive material, and a solid electrolyte.

In the case of using the electrode for solid-state batteries according to the disclosed embodiments as the cathode, the electrode active material is not particularly limited, as long as it is an electrode active material that is generally used as a cathode active material. For example, when transferred ions are lithium ions, as the cathode active material, examples include, but are not limited to, a compound having a layered structure (such as $LiCoO_2$ and $LiNiO_2$), a compound having a spinel-type structure (such as $LiMn_2O_4$), and a compound having an olivine-type structure (such as $LiFePo_4$).

In the case of using the electrode for solid-state batteries according to the disclosed embodiments as the anode, the electrode active material is not particularly limited, as long as it is an electrode active material that is generally used as an anode active material. For example, when the transferred ions are lithium ions, as the anode active material, examples include, but are not limited to, a carbonaceous material, a lithium alloy, an oxide and a nitride.

The binder is not particularly limited, as long as it is chemically and electrically stable. As the binder, examples include, but are not limited to, a fluorine-containing binder such as polyvinylidene fluoride (PVDF) and polytetrafluoroethylene (PTFE).

The electroconductive material is not particularly limited, as long as it has electroconductivity. As the electroconductive material, examples include, but are not limited to, carbonaceous materials such as carbon black, activated carbon, carbon fiber (e.g., carbon nanotube, carbon nanofiber) and graphite.

The material for the solid electrolyte is not particularly limited, as long as it has ion conductivity. As the material, examples include, but are not limited to, inorganic materials such as a sulfide material and an oxide material. As the sulfide material, examples include, but are not limited to, $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, $LiI$—$LiBr$—$Li_2S$—$P_2S_5$ and $Li_2S$—$P_2S_5$—$GeS_2$.

(3) Current Collector

The material for the current collector is not particularly limited, as long as it has electron conductivity. As the material for the current collector, examples include, but are not limited to, Al, Cu, Ni, SUS and Fe. In the case of using the electrode for solid-state batteries according to the disclosed embodiments as the cathode, Al may be used as the material for the current collector. In the case of using the electrode for solid-state batteries according to the disclosed embodiments as the anode, Cu may be used as the material for the current collector.

(4) Properties of Electrode for Solid-State Batteries

When the solid-state battery is in normal use, the value of the electronic resistance of the electrode for solid-state batteries in a room temperature condition (15° C. to 30° C.) may be small. From the viewpoint of exerting the battery reaction stopping function at high temperature, the value of the electronic resistance of the electrode for solid-state batteries in a high temperature condition may be large.

The ratio between the electronic resistance value of the electrode for solid-state batteries in a high temperature condition and the electronic resistance value of the electrode for solid-state batteries in a room temperature condition, may be 1.5 or more, may be 2 or more, or may be 5 or more. When the ratio is too small, there is a possibility that both the excellent battery properties in normal use and the feature of stopping the battery at the time of occurrence of a failure, confining the solid-state battery, etc., are not obtained. Also when the ratio is too small, there is a possibility that the electrode for solid-state batteries is poor in thermal stability.

The ratio between the electronic resistance value of the electrode for solid-state batteries in a high temperature condition and the electronic resistance value of the electrode for solid-state batteries in a room temperature condition, may be 20,000 or less.

(5) Method for Producing the Electrode for Solid-State Batteries

The method for producing the electrode for solid-state batteries is not particularly limited, as long as the above-described electrode for solid-state batteries can be obtained by the method. Hereinafter, two embodiments of the method for producing the electrode for solid-state batteries will be described. The method for producing the electrode for solid-state batteries according to the disclosed embodiments, is not limited to the two embodiments.

A. First Embodiment

The first embodiment of the method for producing the electrode for solid-state batteries comprises (a) forming the first coating layer on one surface of the current collector, (b) forming the PTC resistor layer by applying the second slurry to the surface of the first coating layer, and (c) laminating the electrode active material layer on the PTC resistor layer.

(a) Forming the First Coating Layer on One Surface of the Current Collector

This is a step of forming the first coating layer by applying the first slurry to one surface of the current collector and drying the applied first slurry.

The first slurry contains a carbon-containing electroconductive material, an insulating inorganic substance and a fluorine-containing polymer. Details of the materials are as described above. The content ratio of the carbon-containing electroconductive material, the insulating inorganic substance and the fluorine-containing polymer in the first slurry and in the below-described second slurry, may be appropriately determined so as to correspond to the volume ratio and distribution of the carbon-containing electroconductive material, the insulating inorganic substance and the fluorine-containing polymer in the PTC resistor layer of the electrode for solid-state batteries.

For the content ratio of the materials in the first slurry, the carbon-containing electroconductive material, the fluorine-containing polymer and the insulating inorganic substance may be at a volume ratio of 10:30:60, for example.

The first slurry may contain a non-aqueous solvent for dissolving or dispersing the carbon-containing electroconductive material, the insulating inorganic substance and the fluorine-containing polymer. The type of the non-aqueous solvent is not particularly limited. As the non-aqueous solvent, examples include, but are not limited to, N-methylpyrrolidone, acetone, methyl ethyl ketone and dimethylacetamide. From the viewpoint of safety such as high flash point, small influence on human body and so on, the non-aqueous solvent may be N-methylpyrrolidone.

The content ratio of the non-aqueous solvent in the first slurry is not particularly limited. When the total volume of the first slurry is determined as 100 volume %, the non-aqueous solvent may be from 80 volume % to 93 volume %, or it may be from 82 volume % to 90 volume %.

The method for forming the first coating layer is not particularly limited. In general, the first slurry in which the carbon-containing electroconductive material, the insulating inorganic substance and the fluorine-containing polymer are dispersed in the non-aqueous solvent, is applied onto the current collector, and the applied slurry is dried. To uniformly form the first coating layer, the solid content concentration of the first slurry containing the carbon-containing electroconductive material, the insulating inorganic substance and the fluorine-containing polymer, may be from 13 mass % to 40 mass %.

The thickness of the first coating layer is not particularly limited. It may be from about 1 μm to about 30 μm.

The condition for drying the first slurry is not particularly limited. For example, it may be a temperature condition in which the non-aqueous solvent can be distilled away.

(b) Forming the PTC Resistor Layer by Applying the Second Slurry to the Surface of the First Coating Layer This is a step of forming the PTC resistor layer by applying the second slurry to the surface of the first coating layer on the current collector and drying the applied second slurry. The PTC resistor layer is a layer comprising the solid content of the second slurry and the first coating layer.

The second slurry contains a carbon-containing electroconductive material and a fluorine-containing polymer. The second slurry may further contain an insulating inorganic substance. When the insulating inorganic substance is not contained in the second slurry, contact between the PTC resistor layer and the electrode active material layer can be better compared to the case where the second slurry contains the insulating inorganic substance.

For the content ratio of the materials in the second slurry, in the case where the insulating inorganic substance is not contained in the second slurry, the electroconductive material and the polymer may be at a volume ratio of from 85:15 to 20:80, for example.

The content ratio of the non-aqueous solvent in the second slurry is not particularly limited. When the total volume of the second slurry is determined as 100 volume %, the non-aqueous solvent may be from 75 volume % to 95 volume %, or it may be from 85 volume % to 90 volume %.

The method for applying and drying the second slurry is not particularly limited. In general, the second slurry in which the carbon-containing electroconductive material and the fluorine-containing polymer are dispersed in the non-aqueous solvent, is applied onto the current collector, and the applied slurry is dried. To uniformly apply the second slurry, the solid content concentration of the second slurry containing at least the carbon-containing electroconductive material and the fluorine-containing polymer, may be from 13 mass % to 35 mass %.

The thickness of the layer corresponding to the part formed by applying and drying the second slurry (hereinafter, the layer may be referred to as "second coating layer") is not particularly limited. The thickness may be from about 1 μm to about 10 μm, or it may be from about 2 μm to about 6 μm. The thickness of the second coating layer is obtained from, for example, a difference between the thickness of the laminate before the second coating layer is formed and the thickness of the laminate after the second coating layer is formed.

In general, after the second slurry is applied and dried, the first coating layer and the solid content of the second slurry are combined to form the PTC resistor layer.

Before laminating the electrode active material layer on the PTC resistor layer, the laminate of the current collector and the PTC resistor layer may be pressed. The laminate may be pressed by roll pressing, cold isostatic pressing (CIP), hot isostatic pressing (HIP), etc. When the applied pressing pressure is too high, the PTC resistor layer may be cracked. For example, in the case of roll pressing, the pressing pressure may be a line pressure of from 5.6 kN/cm to 14.2 kN/cm.

By pressing the laminate of the current collector and the PTC resistor layer, the hardness of the electrode active material layer-contacting surface of the PTC resistor layer can be controlled to 0.25 GPa or less (see Examples 3 and 4).

(c) Laminating the Electrode Active Material Layer on the PTC Resistor Layer

By laminating the electrode active material layer on the PTC resistor layer, a laminate of the electrode active material layer, the PTC resistor layer and the current collector is produced. Details of the materials that can be used to form the electrode active material layer (an electrode active material, a binder and a solid electrolyte) are as described above.

As the method for forming the electrode active material layer, a known technique may be used. For example, the electrode active material layer can be formed as follows: a mixture of raw materials for the electrode active material layer is stirred well; the raw material mixture is applied onto a substrate or onto the PTC resistor layer; and the applied raw material mixture is appropriately dried, thereby forming the electrode active material layer.

In the case of forming the electrode active material layer on a substrate, roll pressing in a high temperature condition (hot roll pressing) may be used. By hot roll pressing, the electrode active material layer thus obtained can be more densified. In the case of forming the electrode active material layer on the PTC resistor layer, if the heating temperature of the hot roll pressing is too high, there is a possibility that the polymer in the PTC resistor layer is thermally expanded. Accordingly, it is needed to determine the upper limit temperature of the hot roll pressing, depending on the properties of the polymer, the composition of the PTC resistor layer, etc. In general, the hot roll pressing may be carried out at a temperature less than the melting point of the polymer.

B. Second Embodiment

The second embodiment of the method for producing the electrode for solid-state batteries, comprises (a) forming the first coating layer on one surface of the current collector, (b') forming the second coating layer on one surface of the electrode active material layer, and (c') producing a laminate of the current collector, the PTC resistor layer and the electrode active material layer.

Of them, (a) is the same as the first embodiment described above. Hereinafter, (b') and (c') will be described.

(b') Forming the Second Coating Layer on One Surface of the Electrode Active Material Layer This is a step of forming the second coating layer on the electrode active material layer by applying the second slurry to one surface of a substrate, drying the applied second slurry to form the second coating layer, and then transferring the second coating layer from the substrate to the electrode active material layer.

In the first embodiment, as described above in (b), the second coating layer is formed on the first coating layer. In this step of the second embodiment, the second coating layer is formed on the electrode active material layer. As just described, the two embodiments differ in the member on which the second coating layer is formed.

Transferring the second coating layer from the substrate to the electrode active material layer, is advantageous in that the solvent used in the second slurry has no influence on the electrode active material layer.

The second slurry and the thus-obtained second coating layer are the same as those of the first embodiment.

The substrate used to form the second coating layer is not particularly limited. For example, Al, PET, Cu, SUS or the like may be used.

(c') Producing the Laminate of the Electrode Active Material Layer, the PTC Resistor Layer and the Current Collector In this step, the current collector and the electrode active material layer are laminated so that the first coating layer of the current collector and the second coating layer of the electrode active material layer are in contact with each other, whereby the first coating layer and the second coating layer are combined to form the PTC resistor layer. As a result, the laminate of the electrode active material layer, the PTC resistor layer and the current collector is formed.

(6) Measurement of the Electronic Resistance of the Electrode for Solid-State Batteries An evaluation item of the electrode for solid-state batteries is electronic resistance measurement. For the electronic resistance measurement, a solid-state battery comprising the electrode for solid-state batteries or an evaluation sample comprising the electrode for solid-state batteries, is used.

Hereinafter, the evaluation sample will be described. FIG. 3 is a schematic cross-sectional view of an evaluation sample including the electrode for solid-state batteries according to the disclosed embodiments. An electrode 10 for solid-state batteries shown in FIG. 3 corresponds to the electrode 10 for solid-state batteries shown in FIG. 1 and to an electrode 10 for solid-state batteries shown in FIG. 2. In FIG. 3, the A layer and the B layer are not shown and are omitted for clarity.

As shown in FIG. 3, the layer structure of an evaluation sample 50 is as follows: current collector 3/PTC resistor layer 1/cathode active material layer 2/current collector 3'/cathode active material layer 2/PTC resistor layer 1/current collector 3. As is clear from FIG. 3, the evaluation sample 50 is formed by disposing the current collector 3' between the cathode active material layers 2 of the two electrodes 10 for solid-state batteries, the layers facing each other.

An example of the method for producing the evaluation sample is as follows. First, two laminates of the PTC resistor layer and the current collector (hereinafter, each laminate may be referred to as laminate A) and two laminates of the cathode active material layer and the current collector (hereinafter, each laminate may be referred to as laminate B) were produced. Next, the two laminates B are laminated so that the cathode active material layer of one laminate B and the current collector of the other laminate B are in contact with each other. From a laminate thus obtained, the current collector disposed outside is peeled off, thereby producing a laminate having the following layer structure: cathode active material layer/current collector/cathode active material layer (hereinafter, the laminate may be referred to as laminate C). The laminate C corresponds to the central part (cathode active material layer 2/current collector 3'/cathode active material layer 2) of the evaluation sample 50 shown in FIG. 3. Finally, the two laminates A are laminated on both surfaces of the laminate C so that the cathode active material layers are in contact with the PTC resistor layers, thereby producing the evaluation sample 50 shown in FIG. 3.

FIG. 3 is a schematic view of a circuit for electronic resistance measurement, which includes an evaluation sample. As shown in FIG. 3, a tester 40 is connected to the evaluation sample 50, thereby producing a circuit 200 for electronic resistance measurement. The electronic resistance of the evaluation sample 50 in a room temperature condition (e.g., 25° C.) and the electronic resistance thereof in a high temperature condition (e.g., 250° C.) can be measured by use of the circuit 200 for electronic resistance measurement.

In place of the evaluation sample 50 shown in FIG. 3, a solid-state battery described below may be used for the electronic resistance measurement.

Figure 4:
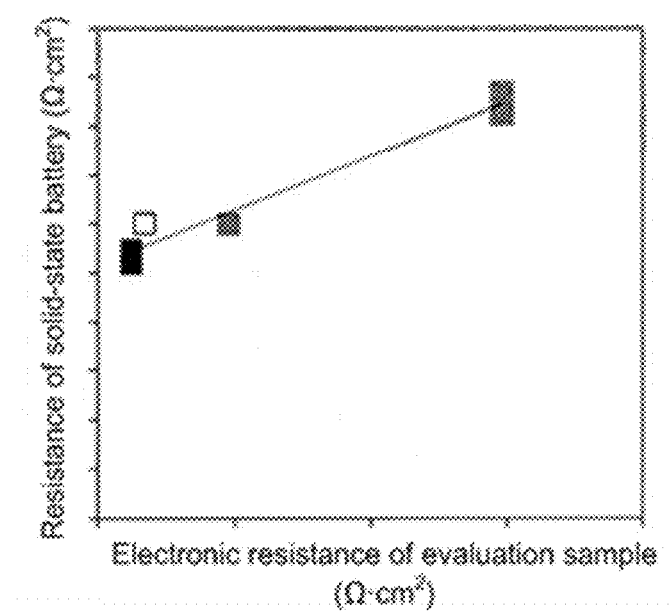
FIG. 4 is a view showing a relationship between the electronic resistance of an evaluation sample of an electrode and the resistance of a solid-state battery comprising the electrode.

FIG. 4 is a view showing a relationship between the electronic resistance of an evaluation sample including a PTC resistor layer and the resistance of a solid-state battery comprising an electrode including the PTC resistor layer. FIG. is a graph with the resistance ($\Omega \cdot cm^2$) of the solid-state battery on the vertical axis and the electronic resistance ($\Omega \cdot cm^2$) of the evaluation sample on the horizontal axis.

As is clear from FIG. 4, the resistance of the solid-state battery increases as the electronic resistance of the evaluation sample increases. As just described, since the electronic resistance of the evaluation sample and the resistance of the solid-state battery are highly correlated with each other, the result of the electronic resistance measurement of the evaluation sample can be said to be a test result reflecting the performance of the solid-state battery itself.

2. Solid-State Battery

The solid-state battery of the disclosed embodiments is a solid-state battery comprising a cathode, an anode and an electrolyte layer disposed between the cathode and the anode, wherein at least one of the cathode and the anode is the above-mentioned electrode for solid-state batteries.

In the disclosed embodiments, the solid-state battery means a battery containing a solid electrolyte. Accordingly, as long as the solid-state battery of the disclosed embodiments contains a solid electrolyte, the solid-state battery may be fully composed of a solid component, or it may contain both a solid component and a liquid component.

Figure 2:
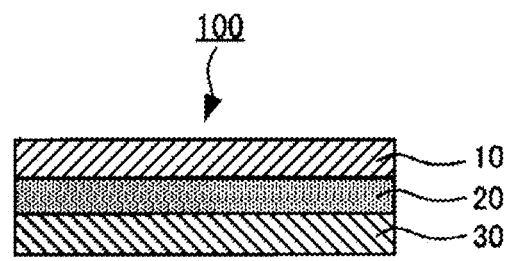
FIG. 2 is a view showing an example of the layer structure of the solid-state battery of the disclosed embodiments, and it is also a schematic cross sectional view of the solid-state battery along the laminating direction.
Figure 3:
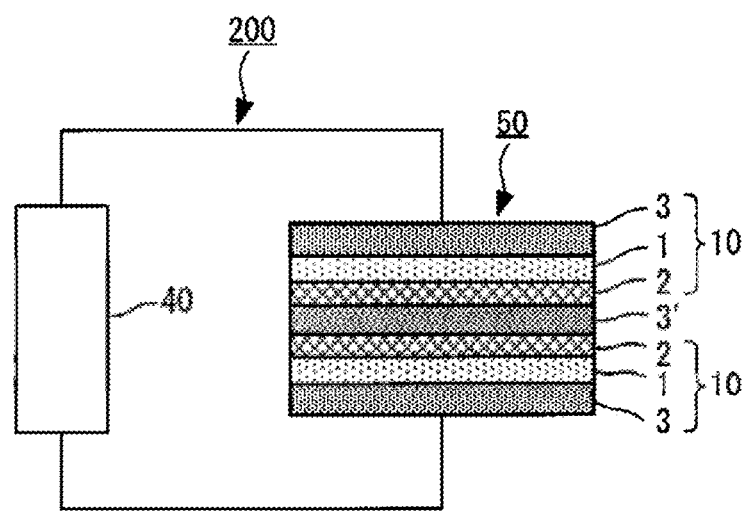
FIG. 3 is a schematic view of a circuit for electronic resistance measurement, which includes an evaluation sample.

FIG. 2 is a view showing an example of the layer structure of the solid-state battery of the disclosed embodiments, and it is also a schematic cross sectional view of the solid-state battery along the laminating direction. As shown in FIG. 2, a solid-state battery 100 comprises the electrode 10 for solid-state batteries, an opposite electrode 30, and an electrolyte layer 20 disposed between the electrode 10 for solid-state batteries and the opposite electrode 30.

The electrode 10 for solid-state batteries corresponds to the above-described electrode for solid-state batteries according to the disclosed embodiments. The opposite electrode is an electrode facing the electrode 10 for solid-state batteries. The electrode 10 for solid-state batteries and the opposite electrode 30 may be the cathode and the anode, respectively; the electrode 10 for solid-state batteries and the opposite electrode 30 may be the anode and the cathode, respectively; or, unlike FIG. 2, each of the cathode and the anode may be the electrode for solid-state batteries according to the disclosed embodiments.

The electrode 10 for solid-state batteries is as described above. The opposite electrode 30, that is, a cathode or anode that is generally used in the solid-state battery, may be selected from known techniques. Especially, the cathode active material layer and cathode current collector which can be used in the cathode, and the anode active material layer and anode current collector which can be used in the anode, may be appropriately selected from the above-described materials used in the disclosed embodiments.

The electrolyte layer 20 is not particularly limited, as long as it is a layer having ion conductivity. The electrolyte layer 20 may be a layer composed of a solid electrolyte only, or it may be a layer containing both a solid electrolyte and a liquid electrolyte.

As the electrolyte layer composed of the solid electrolyte only, examples include, but are not limited to, a polymer solid electrolyte layer, an oxide solid electrolyte layer and a sulfide solid electrolyte layer.

As the electrolyte layer containing both the solid electrolyte and the liquid electrolyte, examples include, but are not limited to, a porous solid electrolyte layer impregnated with an aqueous or non-aqueous electrolyte solution.

The form of the solid-state battery of the disclosed embodiments is not particularly limited. As the form of the solid-state battery, examples include, but are not limited to, common forms such as a coin form, a flat plate form and a cylindrical form.

The solid-state battery of the disclosed embodiments may be a single cell as shown in FIG. 2, or it may be an assembly of the single cells. As the cell assembly, examples include, but are not limited to, a cell stack composed of a stack of single cells in a flat plate form.

As described above, in the pressure-applied condition, the electrode for solid-state batteries according to the disclosed embodiments exerts the excellent effect of suppressing a decrease in solid-state battery performance. Accordingly, the electrode for solid-state batteries according to the disclosed embodiments exerts the excellent effect even when an unintentional pressure is applied (such as occurrence of a failure in the solid-state battery due to an internal short circuit, overcharging, etc.) or even when an intentional pressure is applied (such as use of a confining member in combination with the solid-state battery). In general, a failure occurs in the solid-state battery when an unexpected local pressure is applied to the solid-state battery. Also, in the case of using the confining member in combination with the solid-state battery, a predetermined pressure is generally applied to the whole solid-state battery.

The confining member may be a member that can apply a confining pressure to the laminate of the two electrodes and the electrolyte layer disposed therebetween, in the approximately parallel direction to the laminating direction. A known solid-state battery confining member may be used in combination with the solid-state battery of the disclosed embodiments. As the known solid-state battery confining member, examples include, but are not limited to, a confining member comprising a pair of plates that are used to sandwich the solid-state battery, one or more rods that are used to connect the two plates, and a controller that is connected to the rod(s) and used to control the confining pressure by use of a screw structure, etc. In this case, the confining pressure applied to the solid-state battery can be controlled by appropriately controlling the controller.

The confining pressure is not particularly limited. It may be 0.1 MPa or more, may be 1 MPa or more, or may be 5 MPa or more. When the confining pressure is 0.1 MPa or more, the layers constituting the solid-state battery are in better contact with each other. On the other hand, the confining pressure may be 100 MPa or less, may be 50 MPa or less, or may be 20 MPa or less, for example. When the confining pressure is 100 MPa or less, it is not needed to use the special confining member.

EXAMPLE

Hereinafter, the disclosed embodiments will be further clarified by the following examples. The disclosed embodiments are not limited to the following examples, however.
1. Production of an Evaluation Sample Example 1

(1) Production of a Laminate of a PTC Resistor Layer and an Aluminum Foil

The following materials for a first slurry were prepared.
Carbon-containing electroconductive material: Furnace black (manufactured by: Tokai Carbon Co., Ltd., average primary particle diameter: 66 nm)
Insulating inorganic substance: Alumina (product name: CB-P02, manufactured by: Showa Denko K. K., average particle diameter ($D_{50}$): 2 μm)
Fluorine-containing polymer: PVDF (product name: KF POLYMER L #9130, manufactured by: Kureha Corporation)
Non-aqueous solvent: N-methylpyrrolidone The furnace black, the PVDF and the alumina were mixed at a volume ratio of 10:30:60 to prepare a mixture. The N-methylpyrrolidone was added to the mixture, thereby producing the first slurry. Then, the first slurry was applied on an aluminum foil having a thickness of 15 μm (a current collector). The applied first slurry was dried in a stationary drying oven at 100° C. for one hour, thereby forming a first coating layer having a thickness of 9 μm.

The following materials for a second slurry were prepared.

Carbon-containing electroconductive material: Furnace black (manufactured by: Tokai Carbon Co., Ltd., average primary particle diameter: 66 nm)
Fluorine-containing polymer: PVDF (product name: KF POLYMER L #9130, manufactured by: Kureha Corporation)
Non-aqueous solvent: N-methylpyrrolidone First, the furnace black, the N-methylpyrrolidone and zirconia balls (diameter: 3 μm) were mixed and stirred by a ball mill (product name: AV-1, manufactured by: Asahi-Rika Seisakusho, K.K.) for 300 minutes to obtain a mixture. The PVDF was added to the mixture, and the mixture was further stirred by the ball mill for 1200 minutes. At this time, the amount of the added PVDF was controlled so that the furnace black and the PVDF were at a volume ratio of 40:60. The zirconia balls were removed from the mixture by classification, thereby preparing the second slurry.

The second slurry was applied on the first coating layer of the laminate of the first coating layer and the aluminum foil by a doctor blade method, thereby forming a second coating layer having a thickness of 3 μm. After the second coating layer was formed, the second coating layer and the first coating layer were appropriately mixed and combined, thereby forming the PTC resistor layer.

The above step was carried out twice to produce two laminates of the PTC resistor layer and the aluminum foil (laminates A).
(2) Production of a Laminate of a Cathode Active Material Layer and an Aluminum Foil The following materials for the cathode active material layer were put in a container to obtain a mixture.
Cathode active material: $LiNi_{1/3}Co_{1/3}Mn_{1/3}O_2$ particles (average particle diameter: 6 μm)
Sulfide-based solid electrolyte: $Li_2S$—$P_2S_5$-based glass ceramic particles containing LiI and LiBr (average particle diameter: 0.8 μm)
Electroconductive material: VGCF
Binder: A 5 mass % solution of a PVDF-based binder in butyl butyrate The mixture in the container was stirred by an ultrasonic disperser (product name: UH-50, manufactured by: SMT Co., Ltd.) for 30 seconds. Next, the container was shaken by a shaking device (product name: TTM-1, manufactured by: Sibata Scientific Technology Ltd.) for three minutes. The mixture in the container was further stirred by the ultrasonic disperser for 30 seconds, thereby preparing a slurry for forming the cathode active material layer.

Using an applicator, the slurry for forming the cathode active material layer was applied to one surface of an aluminum foil (serving as a cathode current collector, manufactured by Showa Denko K. K.) by the doctor blade method. The applied slurry was dried on a hot plate at 100° C. for 30 minutes, thereby forming the cathode active material layer on one surface of the aluminum foil.

The above step was carried out twice to produce two laminates of the cathode active material layer and the aluminum foil (laminates B).
(3) Production of an Evaluation Sample First, a laminate C was produced by use of the two laminates B. The laminate C had the following layer structure: cathode active material layer/aluminum foil/cathode active material layer. Details are as follows.

The two laminates B were laminated so that the cathode active material layer of one laminate B and the aluminum foil of the other laminate B were in contact with each other. A laminate thus obtained was subjected to roll pressing at 10 kN/cm in a room temperature condition, thereby obtaining a laminate having the following layer structure: cathode active material layer/aluminum foil/cathode active material layer/aluminum foil. The aluminum foil disposed outside the laminate was peeled off from the laminate. The laminate was subjected to roll pressing at 50 kN/cm at 165° C. to densify the two cathode active material layers, thereby obtaining a laminate having the following layer structure: cathode active material layer/aluminum foil/cathode active material layer (the laminate C).

The laminate C was disposed between the laminates A and they were laminated so that the cathode active material layers of the laminate C were in contact with the PTC resistor layers of the laminates A, thereby obtaining the evaluation sample of Example 1 having the following layer structure: aluminum foil/PTC resistor layer/cathode active material layer/aluminum foil/cathode active material layer/PTC resistor layer/aluminum foil.

A cross section of the evaluation sample of Example 1 was the same as the evaluation sample 50 shown in FIG. 3. As shown in FIG. 3, the layer structure of the evaluation sample 50 was as follows: current collector 3 (aluminum foil)/PTC resistor layer 1/cathode active material layer 2/current collector 3' (aluminum foil)/cathode active material layer 2/PTC resistor layer 1/current collector 3 (aluminum foil). As is clear from FIG. 3, the evaluation sample 50 was formed by disposing the current collector 3' (aluminum foil) between the two electrodes 10 for solid-state batteries.

Example 2

The evaluation sample of Example 2 was produced in the same manner as Example 1, except for the following three respects in "(1) Production of a laminate of a PTC resistor layer and an aluminum foil".

The volume ratio of the furnace black to the PVDF in the second slurry was changed from 40:60 to 20:80.
The second slurry applying method was changed from the doctor blade method to a gravure coating method.
The thickness of the second coating layer formed by use of the second slurry was changed from 3 µm to 2 µm.

Example 3

The evaluation sample of Example 3 was produced in the same manner as Example 2, except that after the laminates A were produced (see "(1) Production of a laminate of a PTC resistor layer and an aluminum foil" in Example 1), the laminates A were subjected to roll pressing under the conditions of a line pressure of 5.6 kN/cm and room temperature.

Example 4

The evaluation sample of Example 4 was produced in the same manner as Example 2, except that after the laminates A were produced (see "(1) Production of a laminate of a PTC resistor layer and an aluminum foil" in Example 1), the laminates A were subjected to roll pressing under the conditions of a line pressure of 14.2 kN/cm and room temperature.

Comparative Example 1

The evaluation sample of Comparative Example 1 was produced in the same manner as Example 1, except for the following two respects.

In "(1) Production of a laminate of a PTC resistor layer and an aluminum foil", two laminates A' were produced, each of which was a laminate of the aluminum foil and the PTC resistor layer that was composed of the first coating layer only (the second coating layer was not formed).

In "(3) Production of an evaluation sample", the laminate C was disposed between the laminates A' and they were laminated so that the cathode active material layers of the laminate C were in contact with the PTC resistor layers (each composed of the first coating layer only) of the laminates A', thereby producing the evaluation sample of Comparative Example 1 having the following layer structure: aluminum foil/(PTC resistor layer composed of the first coating layer only)/cathode active material layer/aluminum foil/cathode active material layer/(PTC resistor layer composed of the first coating layer only)/aluminum foil.

That is, the evaluation sample of Comparative Example 1 differs from the evaluation sample of Example 1 in the following respect: in place of the laminates A, the evaluation sample of Comparative Example 1 included the laminates A', in each of which the second coating layer was not formed.

2. Evaluation of the Evaluation Samples

The evaluation samples of Examples 1 to 4 and Comparative Example 1 were evaluated as follows. The results are shown in Table 1.

(1) Measurement of Hardness

For each of the laminates A (the laminates of the PTC resistor layer and the aluminum foil) used to produce the evaluation samples, the hardness of the PTC resistor layer-side surface was measured. The PTC resistor layer-side surface serves as the electrode active material layer-contacting surface when it is incorporated in the evaluation sample.

The hardness was measured by use of a nanoindenter (product name: G200, manufactured by: MTS Systems Corporation) and in accordance with ISO 14577:2015 (Part. 1: Test method). More specifically, 15 points at an indentation depth of from 400 nm to 600 nm were measured for hardness (GPa), and the average of the hardness values thus obtained was determined as the hardness of each evaluation sample.

(2) Calculation of the C/F Value

First, each evaluation sample was subjected to cross section polishing by a cross section polisher (CP), thereby obtaining two cross sections. One of the cross sections of the PTC resistor layer was observed with a field emission-scanning electron microscope (FE-SEM), thereby obtaining a SEM image.

Next, on the SEM image, the PTC resistor layer was divided into the A layer and the B layer in order from nearest to furthest from the electrode active material layer so that, at any point of the PTC resistor layer, the ratio of the thickness of the A layer to the thickness of the B layer was 1:2 in the thickness direction of the PTC resistor layer. Accordingly, on the SEM image, the cross-sectional area of the A layer was one-third of the cross-sectional area of the whole PTC resistor layer, and the cross-sectional area of the B layer was two-thirds of the cross-sectional area of the whole PTC resistor layer.

Next, a cross section of the A layer of each evaluation sample was defined by use of the SEM image and subjected to elemental analysis by flat quad-energy dispersive X-ray spectroscopy (FQ-EDX). From the results of the elemental analysis, the amount (atomic %) of C contained in the cross section of the A layer and the amount (atomic %) of F contained therein were calculated. The C amount (atomic %) was divided by the F amount (atomic %), and the resulting value was used as the C/F value of the evaluation sample.

(3) Measurement of the Electronic Resistance

As shown in FIG. 3, a tester ("40" in FIG. 3, product name: RM3545, manufactured by: Hioki E.E. Corporation) was connected to the evaluation sample 50, thereby producing the circuit 200 for electronic resistance measurement. The electronic resistance of the evaluation sample 50 in a room temperature (25° C.) condition and the electronic resistance thereof in a temperature condition of 250° C., were measured by use of the circuit 200 for electronic resistance measurement.

In Example 3, the electronic resistance measurement in the temperature condition of 250° C. was not carried out. The reason is as follows. The evaluation sample of Example 3 was produced in the same manner as the evaluation samples of Examples 2 and 4, except for the roll pressing pressure condition. As shown in the following Table 1, the electronic resistance values of Examples 2 and 4 in the temperature condition of 250° C. are high. Accordingly, it is clear that the electronic resistance value of the evaluation sample of Example 3 in the temperature condition of 250° C. is also high. Accordingly, the electronic resistance measurement in the same temperature condition was not carried out in Example 3.

The following Table 1 is a table comparing the production conditions and evaluation results of the evaluation samples of Examples 1 to 4 and Comparative Example 1. Of the items relating to electronic resistance shown in Table 1, "Room temperature (%)" shows the relative values (%) of the electronic resistances of Examples 1 to 4 in the room temperature condition when the electronic resistance value of Comparative Example 1 in the room temperature condition is determined as 100%; "250° C. (%)" shows the relative values (%) of the electronic resistances of Examples 1 to 4 in the temperature condition of 250° C. when the electronic resistance value of Comparative Example 1 in the temperature condition of 250° C. is determined as 100%; and "250° C./Room temperature" shows the value obtained by dividing the electronic resistance value (actual measured value) of each evaluation sample in the temperature condition of 250° C. by the electronic resistance value (actual measured value) thereof in the room temperature condition. That is, the value of "250° C./Room temperature" is a value indicating how many times larger the electronic resistance value in the temperature condition of 250° C. is than the electronic resistance value in the room temperature condition.

3. Conclusion

According to Table 1, the hardness of Comparative Example 1 is 0.52 GPa. This result indicates that for the evaluation sample of Comparative Example 1, the hardness of the electrode active material layer-contacting surface of the PTC resistor layer, is too hard. The C/F value of Comparative Example 1 is 4.8. This result indicates that for the evaluation sample of Comparative Example 1, the composition of a part of the PTC resistor layer, which is on the side near the electrode active material layer, contains too much carbon.

Meanwhile, the hardnesses of Examples 1 to 4 are 0.36 GPa or less. These results indicate that for the evaluation samples of Examples 1 to 4, the hardness of the electrode active material layer-contacting surface of the PTC resistor layer, is moderately soft, and the PTC resistor layer shows moderate contact and followability with respect to the electrode active material layer. The C/F values of Examples 1 to 4 are from 2.4 to 3.9. These results indicate that for the evaluation samples of Examples 1 to 4, the composition of the part of the PTC resistor layer, which is on the side near the electrode active material layer, keeps a good balance between the carbon content ratio and the fluorine content ratio.

According to Table 1, each of the electronic resistance values of Examples 1 to 4 in the room temperature condition, is from 10% to 17% of the electronic resistance value of Comparative Example 1 in the room temperature condition.

Accordingly, the following was proved: the hardness of the electrode active material layer-contacting surface of the PTC resistor layer, is the specific value or less, and the content ratio of carbon atoms with respect to fluorine atoms in the A layer that is near the electrode active material layer, is in the specific value range, whereby the electrode active material layer-contacting surface of the PTC resistor layer has better flexibility than ever before, and excellent contact between the PTC resistor layer and the electrode active material layer is obtained, resulting in excellent followability of the PTC resistor layer to the electrode active material layer surface. As a result, when the electrode is used in a solid-state battery, an increase in the electronic resistance at the interface between the PTC resistor layer and the electrode active material layer, is suppressed, and a decrease in the performance of the solid-state battery is suppressed.

Also, the electronic resistance values of Examples 1, 2 and 4 in the temperature condition of 250° C., are 169 times or higher the electronic resistance values thereof in the room temperature condition (see "250° C./Room temperature" in Table 1). It is presumed that the electronic resistance value

TABLE 1

| | Production conditions | | | Evaluation items | | | |
|---|---|---|---|---|---|---|---|
| | Second coating layer | | Roll pressing | | | Electronic resistance | |
| | | | | | | Room | | |
| | C/PVDF (Volume ratio) | Thickness (μm) | pressure (kN/cm) | Hardness (GPa) | C/F value | temperature (%) | 250° C. (%) | 250° C./Room temperature |
| Example 1 | 40/60 | 3.0 | — | 0.36 | 3.1 | 17 | 205 | 169 |
| Example 2 | 20/80 | 2.0 | — | 0.23 | 2.4 | 13 | 6049 | 6563 |
| Example 3 | 20/80 | 2.0 | 5.6 | 0.25 | 3.9 | 11 | — | — |
| Example 4 | 20/80 | 2.0 | 14.2 | 0.22 | 2.6 | 10 | 14279 | 19991 |
| Comparative Example 1 | — | — | — | 0.52 | 4.8 | 100 | 100 | 14 | of Example 3 in the temperature condition of 250° C. is also higher than the electronic resistance value in the room temperature condition. This indicates that since the C/F values are from 2.4 to 3.9, the electrodes for solid-state batteries of Example 1 to 4 are excellent in thermal stability.

As described above, the results of the electronic resistance measurement of the evaluation samples can be said to be test results reflecting the performance of the solid-state battery itself (FIG. 4).

REFERENCE SIGNS LIST

1. PTC resistor layer
1*a*. A layer
1*b*. B layer
2. Electrode active material layer
3, 3'. Current collector
10. Electrode for solid-state batteries
20. Electrolyte layer
30. Opposite electrode
40. Tester
50. Evaluation sample
100. Solid-state battery
200. Circuit for electronic resistance measurement

The invention claimed is:

1. An electrode for solid-state batteries, the electrode comprising:
    an electrode active material layer;
    a current collector; and
    a PTC resistor layer disposed between the electrode active material layer and the current collector, the PTC resistor layer being in contact with the electrode active material layer,
    wherein the PTC resistor layer contains a carbon-containing electroconductive material, an insulating inorganic substance and a fluorine-containing polymer,
    wherein a hardness of a surface of the PTC resistor layer that contacts the electrode active material layer, is 0.36 GPa or less,
    wherein the PTC resistor layer is divided into an A layer and a B layer in order from nearest to furthest from the electrode active material layer so that, at any point of the PTC resistor layer, a ratio of a thickness of the A layer to a thickness of the B layer is 1:2 in a thickness direction of the PTC resistor layer,
    wherein a value obtained by dividing an atomic percentage of carbon atoms contained in the A layer by an atomic percentage of fluorine atoms contained in the A layer is from 2.4 to 3.9, and
    wherein a content of the insulating inorganic substance in the A layer is smaller than a content of the insulating inorganic substance in the B layer.

2. The electrode for solid-state batteries according to claim 1, wherein the hardness of the surface of the PTC resistor layer that contacts the electrode active material layer is from 0.22 GPa to 0.36 GPa.

3. The electrode for solid-state batteries according to claim 1, wherein the insulating inorganic substance is a metal oxide.

4. The electrode for solid-state batteries according to claim 1, wherein the carbon-containing electroconductive material is carbon black.

5. A solid-state battery comprising a cathode, an anode and an electrolyte layer disposed between the cathode and the anode, wherein at least one of the cathode and the anode is the electrode for solid-state batteries defined by claim 1.

6. The electrode for solid-state batteries according to claim 1, wherein a carbon amount in the A layer is larger than a carbon amount in the B layer.

* * * * *